(12) United States Patent
Yokoyama

(10) Patent No.: US 7,080,166 B2
(45) Date of Patent: Jul. 18, 2006

(54) MULTIFUNCTIONAL APPARATUS, INFORMATION PROCESSING APPARATUS, DATA PROCESSING METHOD, AND COMPUTER PROGRAM PRODUCT EXECUTED BY THE MULTIFUNCTIONAL APPARATUS OR THE INFORMATION PROCESSING APPARATUS

(75) Inventor: Hidehiko Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 10/025,926

(22) Filed: Dec. 26, 2001

(65) Prior Publication Data

US 2002/0087764 A1    Jul. 4, 2002

(30) Foreign Application Priority Data

Dec. 28, 2000  (JP)  .............................. 2000-401221
Nov. 15, 2001  (JP)  .............................. 2001-350071

(51) Int. Cl.
*G06F 3/00* (2006.01)
*G06F 13/00* (2006.01)
*H04N 1/00* (2006.01)

(52) U.S. Cl. .......................... 710/10; 710/104; 710/8; 710/9; 709/102; 358/400

(58) Field of Classification Search ................ 710/104, 710/8, 9, 10, 100; 709/102, 1, 106; 358/400
See application file for complete search history.

(56) References Cited

U.S. PATENT DOCUMENTS 5,835,577 A * 11/1998 Disanto et al. .......... 379/93.19
5,930,472 A *  7/1999 Smith ........................ 709/203
6,085,242 A *  7/2000 Chandra .................... 709/223
6,438,574 B1 *  8/2002 Nagashima ................. 718/102
6,442,625 B1 *  8/2002 Robinson et al. .............. 710/8
6,549,217 B1 *  4/2003 De Greef et al. ........... 715/745
6,560,640 B1 *  5/2003 Smethers .................... 709/219
6,626,957 B1 *  9/2003 Lippert et al. .............. 715/513
6,657,743 B1 * 12/2003 Otsuka et al. ............. 358/1.15
6,671,066 B1 * 12/2003 Aikawa et al. ............ 358/1.18
6,674,357 B1    1/2004 Kadowaki .................. 358/1.15
6,674,541 B1 *  1/2004 Kamiyama et al. ........ 358/1.15
6,915,119 B1 *  7/2005 Konishi .................... 455/127.1

FOREIGN PATENT DOCUMENTS

JP    11-055273      2/1999
JP    11-355497     12/1999
JP    2000-041123    2/2000

* cited by examiner

*Primary Examiner*—John R. Cottingham
*Assistant Examiner*—Christopher Daley
(74) *Attorney, Agent, or Firm*—Fitzpatrick, Cella, Harper & Scinto

(57) ABSTRACT

A communication apparatus has a communication unit that transmits data to a designated destination, and a management unit that manages ID information determined for each user and address location information associated with the ID information, wherein the address location information indicates a location that stores address information for designating the destination to transmit the data by said communication unit. The user inputs the ID information via an input unit, and an obtaining unit specifies the address location information managed by said management unit based on the input ID information, communicate with an external apparatus via a network based on the address location information, and obtains the address information residing at the external apparatus corresponding to the location specified by the address location information. The communication unit transmits the data to the destination designated from the address information obtained by said obtaining unit.

25 Claims, 10 Drawing Sheets

FIG. 7
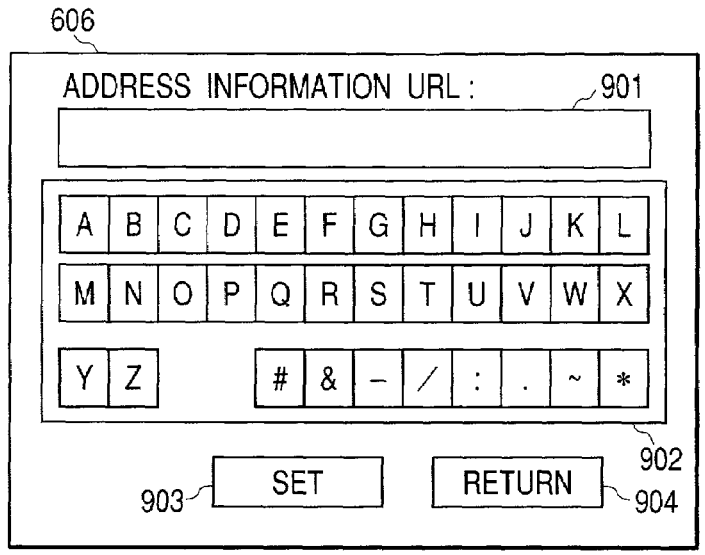
FIG. 8
| USER NAME | PASSWORD | ADDRESS INFORMATION URL |
|---|---|---|
| 1231 | 0123 | ftp://172.20.1.1/addr.txt |
| 1234 | 5678 | http://172.20.1.12/addr.html |
| 1236 | 6321 | |
FIG. 9
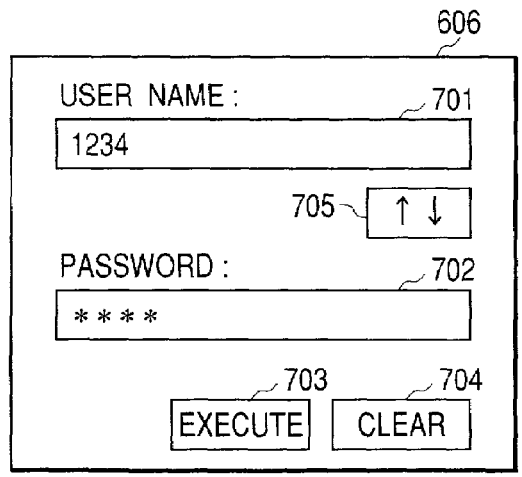

FIG. 11

| NAME | FAX NUMBER | E-MAIL ADDRESS |
|---|---|---|
| DESTINATION 1 | 0123-45-6789 | 123@ab.com |
| DESTINATION 2 | 098-765-4321 | |
| DESTINATION 3 | 03-4567-7890 | 987@zyx.org |

```
<?xml version= "1.0" ?>
<Address number= "3" >
<item>
<name> DESTINATION 1</name>
<fax>0123-45-6789</fax>
<e-mail>123@ab.com</e-mail>
</item>
<item>
<name> DESTINATION 2</name>
<fax>098-765-4321</fax>
</item>
<item>
<name> DESTINATION 3</name>
<fax>03-4567-7890</fax>
<e-mail>345@zyx.org</e-mail>
</item>
</Address>
```

| USER NAME | PASSWORD | ADDRESS INFORMATION URL | UPDATE INTERVAL | UPDATE DATE | |
|---|---|---|---|---|---|
| 1231 | 0123 | ftp://172.20.1.1/addr.xml | 0 | 010101 | 1601 |
| 1234 | 5678 | http://172.20.1.12/addr.asp | 10 | 010401 | |
| 1236 | 6321 | | 7 | 010704 | |

1602

MULTIFUNCTIONAL APPARATUS, INFORMATION PROCESSING APPARATUS, DATA PROCESSING METHOD, AND COMPUTER PROGRAM PRODUCT EXECUTED BY THE MULTIFUNCTIONAL APPARATUS OR THE INFORMATION PROCESSING APPARATUS

BACKGROUND OF THE INVENTION

1. Field of the Invention

The present invention relates to: a multifunctional apparatus and an information processing apparatus which are capable of communicating with an external apparatus via a predetermined communication medium; a data processing method; and a computer program product executable by the multifunctional apparatus or the information processing apparatus.

2. Related Background Art

Conventionally, in the case where a multifunctional apparatus having a plurality of functions of a copier, a scanner, a printer, a facsimile, and the like transmits data to a specified destination by performing facsimile transmission or the like, address information used to specify the destination is independently managed by each of an information processing apparatus and the multifunctional apparatus.

With this conventional technique, however, in the case where data transmission such as facsimile transmission, is performed by remotely connecting to the multifunctional apparatus from the information processing apparatus, address information managed by the information processing apparatus is used in usual cases.

If an attempt is made to perform data transmission by directly operating the multifunctional apparatus, however, there occurs a problem in that it is impossible to obtain appropriate address information because the address information usable at the multifunctional apparatus differs from the address information of the information processing apparatus.

SUMMARY OF THE INVENTION

The present invention has been made to solve the problem described above and a primary object of the present invention is to provide a multifunctional apparatus, an information processing apparatus, and a data processing method, with which it is possible to freely construct a data processing environment having superior convenience in which communication information managed by an external apparatus connected via a predetermined communication medium is obtained and is used without difficulty. The primary object of the present invention is also to provide a computer program executable by the multifunctional apparatus or the information processing apparatus.

Also, a secondary object of the present invention is to provide a multifunctional apparatus, an information processing apparatus, and a data processing method, with which it is possible to freely construct a data processing environment having superior convenience in which if an external apparatus receives a request for communication information from the multifunctional apparatus, the communication information is converted (translated) into communication information that is usable at the multifunctional apparatus and the converted communication information is transferred to the multifunctional apparatus that has requested the information, thereby making it possible for the multifunctional apparatus to use the communication information without difficulty even if the communication information is managed by the external apparatus in a unique data format. The secondary object of the present invention is also to provide a computer program executable by the multifunctional apparatus or the information processing apparatus.

To realize the above objects, the present invention has the following construction. That is, a multifunctional apparatus according to the present invention is comprised of: a management means for managing ID information determined for each user and address location information associated with the ID information; an input means with which the user inputs the ID information; and an obtaining means for specifying the address location information managed by the management means using the inputted ID information, communicating with an external apparatus via a predetermined communication medium on the basis of the address location information, and obtaining communication information residing at an address location specified by the address location information.

Other features and advantage of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 shows another example of the operation screen displayed on the touch panel shown in FIG. 5;

FIG. 8 shows an example of a user table reserved in an internal memory of the MFP shown in FIG. 2;

FIG. 9 shows a still another example of the operation screen displayed on the touch panel shown in FIG. 5;

FIG. 11 shows an example of address information managed at the information processing apparatus according to the present invention;

FIG. 12 shows an example of address information managed at the MFP according to the present invention;

DESCRIPTION OF THE PREFERRED EMBODIMENT

A preferred embodiment of the present invention will be described in detail below with reference to the drawings.

Figure 1:
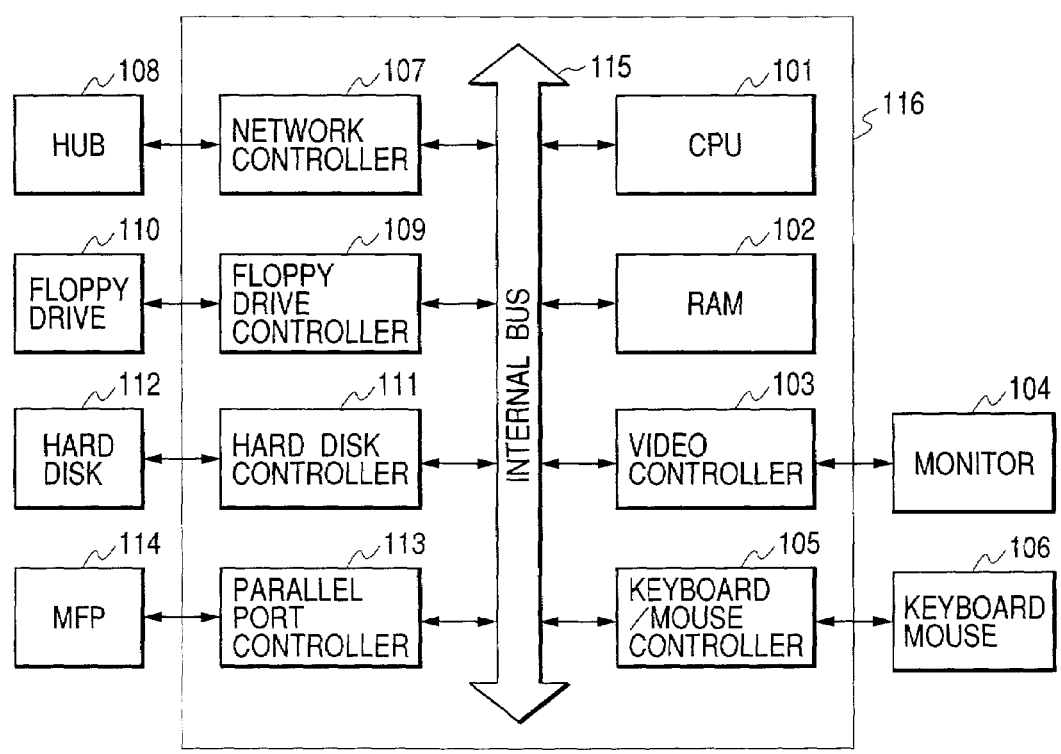
FIG. 1 is a block diagram illustrating the construction of an information processing apparatus in accordance with an embodiment of the present invention.

FIG. 1 is a block diagram illustrating the system construction of an information processing apparatus in accordance with the embodiment of the invention.

In FIG. 1, reference numeral 101 denotes a CPU. The CPU 101 executes a program stored in a RAM 102 or the like, loads into the RAM 102 a program or data that is stored in a hard disk 112 or a floppy disk (FD) 1302 shown in FIG. 13 that is inserted into a floppy disk drive 110, and inversely stores the contents of the RAM 102 on the FD 1302 or the hard disk 112.

Reference numeral 103 denotes a video controller that throws an image of processing information and the like onto a connected monitor 104. Numeral 106 represents input devices, such as a keyboard and a mouse. Inputs from these input devices are processed by a program running on the CPU 101 through a controller 105. Numeral 114 indicates a multifunctional apparatus (MFP) having a plurality of functions (multi-functions) of a scanner, a printer, a facsimile, and the like. The multifunctional apparatus 114 is connected to a parallel port controller 113. It is also possible to directly connect the multifunctional apparatus 114 to a network in the same manner as an MPF 201 shown in FIG. 2. The CPU, the RAM, and each controller are connected to an internal bus 115 and perform exchange of control information and data.

Reference numeral 107 denotes a network controller that controls communications with network devices connected via a hub 108. Numeral 109 represents a floppy disk drive controller that controls access to a floppy disk set in the floppy disk drive 110. Numeral 111 indicates a hard disk controller that controls access to the hard disk 112.

Figure 2:
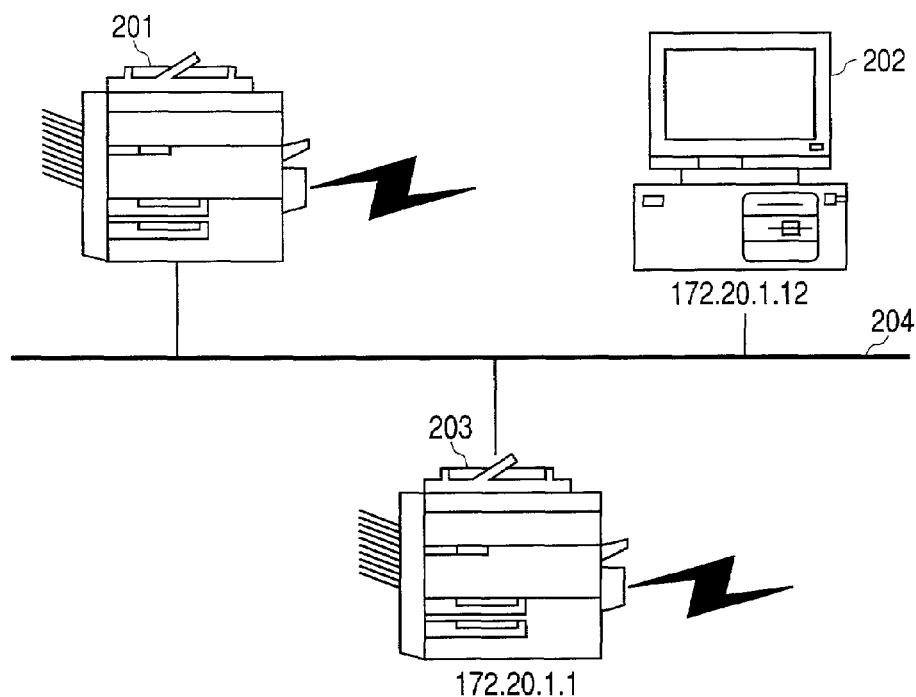
FIG. 2 illustrates the construction of a network system constructed using the information processing apparatus and multifunctional apparatuses according to the present invention.

FIG. 2 illustrates the construction of a network including the information processing apparatus and multifunctional apparatuses according to the present invention. This drawing corresponds to an example in which a system is constructed by connecting multifunctional apparatuses (MFP) of a multifunction type to the information processing apparatus 116 via a predetermined network 204.

In FIG. 2, each of reference numerals 201 and 203 denotes a multifunctional apparatus (MFP) that is constructed so as to be capable of performing facsimile transmission/reception processing via a public line that is not shown in the drawing. Numeral 202 represents an information processing apparatus. Here, it is assumed that the information processing apparatus is assigned a network address "172. 20. 1. 12" and the MFP 203 is given a network address "172. 20. 1. 1".

Figure 3:
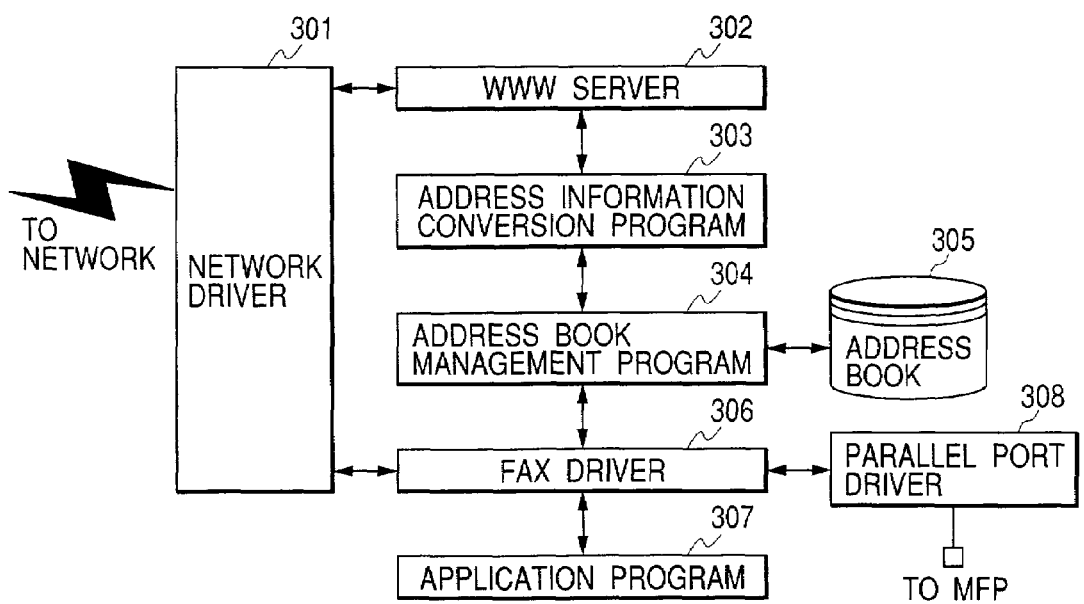
FIG. 3 is a block diagram illustrating a software construction within the information processing apparatus shown in FIG. 1.

FIG. 3 is a block diagram illustrating the software construction within the information processing apparatus 202 shown in FIG. 2.

In FIG. 3, reference numeral 301 denotes a network driver that controls the network controller 107 shown in FIG. 1 and, for instance, performs inputs and outputs of data via the network 204 shown in FIG. 2.

Reference numeral 302 denotes a WWW server that recognizes an HTTP packet passed from the network driver 301 and outputs specified data. An address information conversion program 303 is activated by the WWW server 302 and operates an address book management program 304, thereby converting (translating) addresses registered in an address book (address list) 305 placed on the hard disk 112 shown in FIG. 1 or the like into address information that is processible in the MFPs 201 and 203 shown in FIG. 2 or the like.

Reference numeral 306 represents a FAX driver that converts specified images and document information into a format that is suitable for FAX transmission according to a facsimile transmission request from an application program 307 and outputs the converted images and document information to a parallel port driver 308 or the network driver 301. The FAX driver 306 also registers an address in the address book 305 and obtains an address registered therein by operating the address book management program 304. The parallel port driver 308 controls the parallel port controller 113 shown in FIG. 1, thereby transmitting data outputted from the FAX driver 306 to the multifunctional apparatuses connected to a parallel port.

Figure 4:
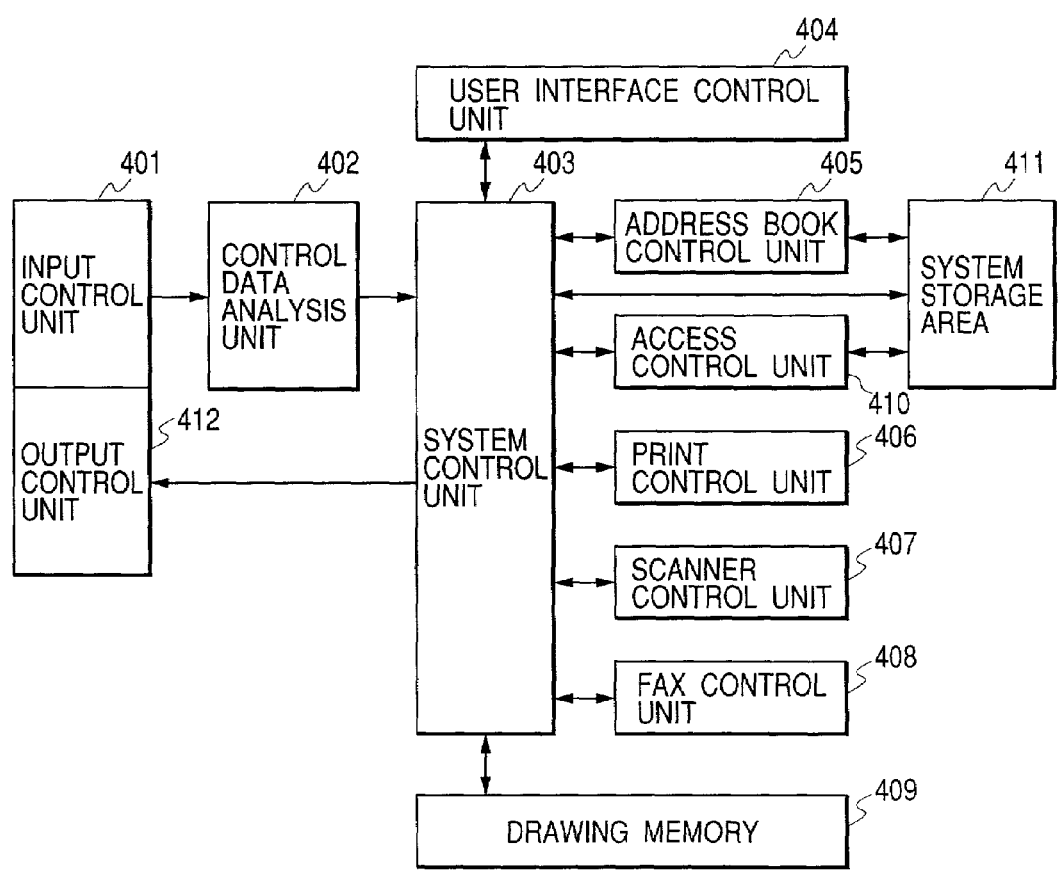
FIG. 4 is a block diagram illustrating a control construction of each multifunctional apparatus (MFP) shown in FIG. 2.

FIG. 4 is a block diagram illustrating the control construction of the multifunctional apparatuses (MFPS) 201 and 203 shown in FIG. 2.

In FIG. 4, reference numeral 401 denotes an input control unit that obtains control information and data received via a communication medium such as a network. A control data analysis unit 402 analyzes the control information and data, and outputs a predetermined instruction to a system control unit 403. The system control unit 403 receives instructions from the control data analysis unit 402, a user interface control unit 404, an address book control unit 405, an access control unit 410, a print control unit 406, a scanner control unit 407, and a FAX control unit 408. The system control unit 403 also outputs predetermined instructions to respective units.

If an instruction that specifies copy processing is outputted from the user interface control unit 404, for instance, the system control unit 403 instructs the scanner control unit 407 to perform a scan operation, holds in a drawing memory 409 image data obtained by the scanning of a source document by a document reading unit (not shown), and instructs the print control unit 406 to print this data. In this manner, the copy processing is performed.

Also, image data read by the scanner control unit 407 or facsimile image data received by the FAX control unit 408 is transmitted together with destination information and the like from an output control unit 412 to another apparatus by utilizing a predetermined network or the like.

Figure 5:
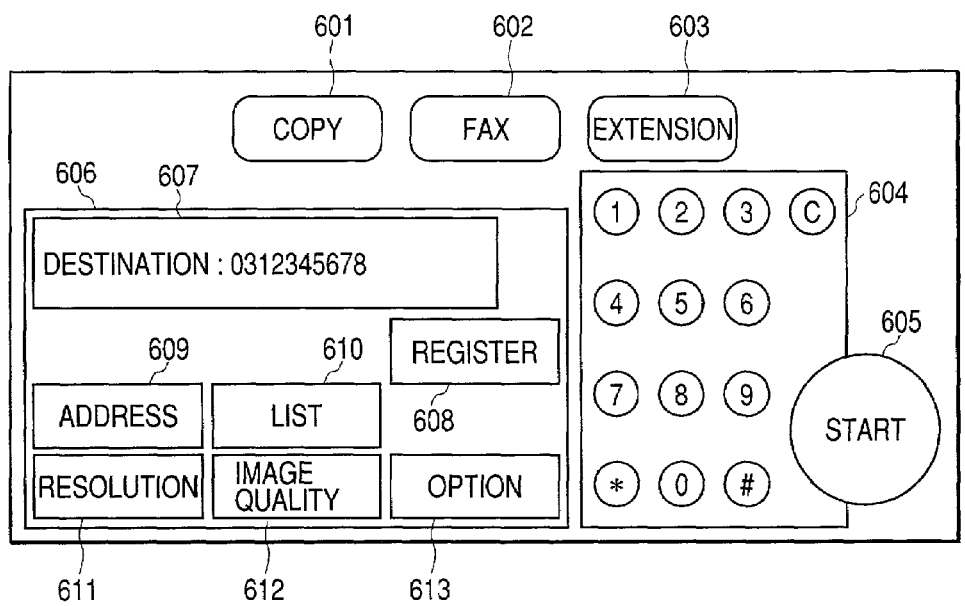
FIG. 5 is a plain view showing an example of an operation panel of the MFP shown in FIG. 2.

FIG. 5 is a plan view showing an example of an operation panel of the multifunctional apparatuses (MFPs) 201 and 203 shown in FIG. 2. This drawing shows an example in which a facsimile button 602 is pushed and a display operation is performed in a facsimile mode.

In FIG. 5, reference numeral 601 denotes a copy button, numeral 602 a facsimile button, numeral 603 an extension button. The operation mode of each multifunctional apparatus is switched by the pushing of each button and the contents displayed on a touch panel 606 are changed accordingly. The touch panel 606 displays a device state and input items corresponding to each operation mode. In addition, it is possible for a user to change settings and perform input operations by directly touching the panel.

Reference numeral 604 represents a numeral input key (ten key) that is used to set the number of copies to be made in a copy mode or to specify a destination (facsimile number) in the facsimile mode. Numeral 605 indicates a start button. By pushing this button, copying or facsimile transmission is started under settings that are currently displayed on the touch panel 606.

Reference numeral 607 denotes a destination display area in which a facsimile number inputted using the input key 604 is displayed. When a register key 608 is touched, this facsimile number is registered as a destination. If a list key 610 is touched, a list of facsimile numbers registered as destinations is displayed on the touch panel 606. If a resolution key 611 or an image quality key 612 is touched, a screen through which transmission resolution or transmission image quality is to be set is displayed on the touch panel 606. Numeral 613 represents an option key. When the option key 613 is touched, an operation screen, such as a screen shown in FIG. 7 (to be described later) through which address information is to be inputted, is displayed on the touch panel 606.

Figure 6:
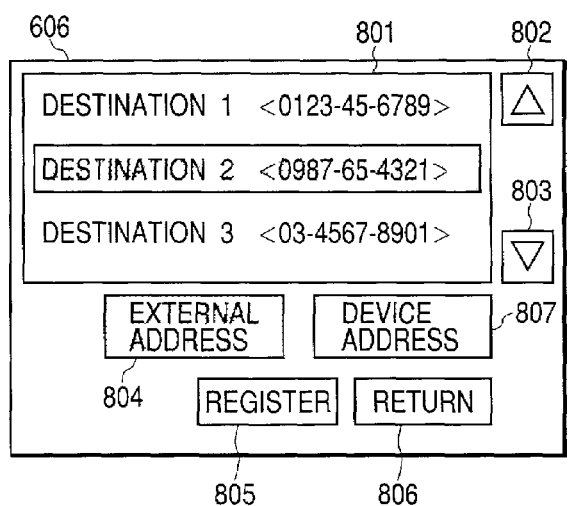
FIG. 6 shows an example of an operation screen displayed on a touch panel shown in FIG. 5.

FIG. 6 shows an example of the operation screen displayed on the touch panel 606 shown in FIG. 5. This example concerns a case where an address list is displayed on the touch panel 606 when the user touches an address key 609 shown in FIG. 5.

In FIG. 6, reference numeral 801 indicates an address display area. If the user touches an external address key 804, a list of address information obtained in advance from other information processing apparatuses or MFPs is displayed in this address display area 801. If the user touches a device address key 807, a list of device addresses registered in the MFP is displayed in the address display area 801.

Numerals 802 and 803 represent scroll keys that are respectively used to scroll up and down the display contents of the address list. Numeral 805 denotes a register key that is used to register an address highlighted in reverse video as a transmission destination. Note that if the user touches a return key 806, the panel display is switched to the display state of the touch panel 606 shown in FIG. 5.

FIG. 7 shows another example of the operation screen displayed on the touch panel 606 shown in FIG. 5. This drawing concerns a case where the user touches the option key 613 shown in FIG. 5 and the display on the touch panel 606 is switched to a screen through which an address information URL is to be set.

In FIG. 7, reference numeral 901 denotes an input area in which the user who is currently performing processing sets an address information URL. When the user pushes a touch panel keyboard 902 or the input key 604 shown in FIG. 5, characters, numbers, and symbols corresponding to the pushed keys are inputted. If the user touches a set key 903 after this operation, the character string inputted into the input area 901 is, for instance, stored in a user table shown in FIG. 8 (reserved in a system storage area 411 within the MFP shown in FIG. 4).

It should be noted here that in this embodiment, an administrator of the multifunctional apparatus preregisters a user name and password for each user of the MFP.

FIG. 8 shows an example of the user table reserved in the system storage area of the MFPs 201 and 203 shown in FIG. 2. This user table is composed of user names, passwords, and address information URLs.

FIG. 9 shows a still another example of the operation screen displayed on the touch panel 606 shown in FIG. 5. This example corresponds to a screen that requests the user of the MFP to input his/her user name and password.

In FIG. 9, if the multifunctional apparatus (MFP) is activated, the screen shown in FIG. 9 that requests the input of a user name and password which are necessary to use the MFP is displayed on the touch panel 606 shown in FIG. 5. The user of the MFP inputs his/her user name and password using the input key 604 shown in FIG. 5.

The present embodiment will be described below by taking, as an example, a case where the MFP 201 shown in FIG. 2 obtains address information from the information processing apparatus 202. The following description will be made with reference to the flowchart shown in FIG. 10.

Figure 10:
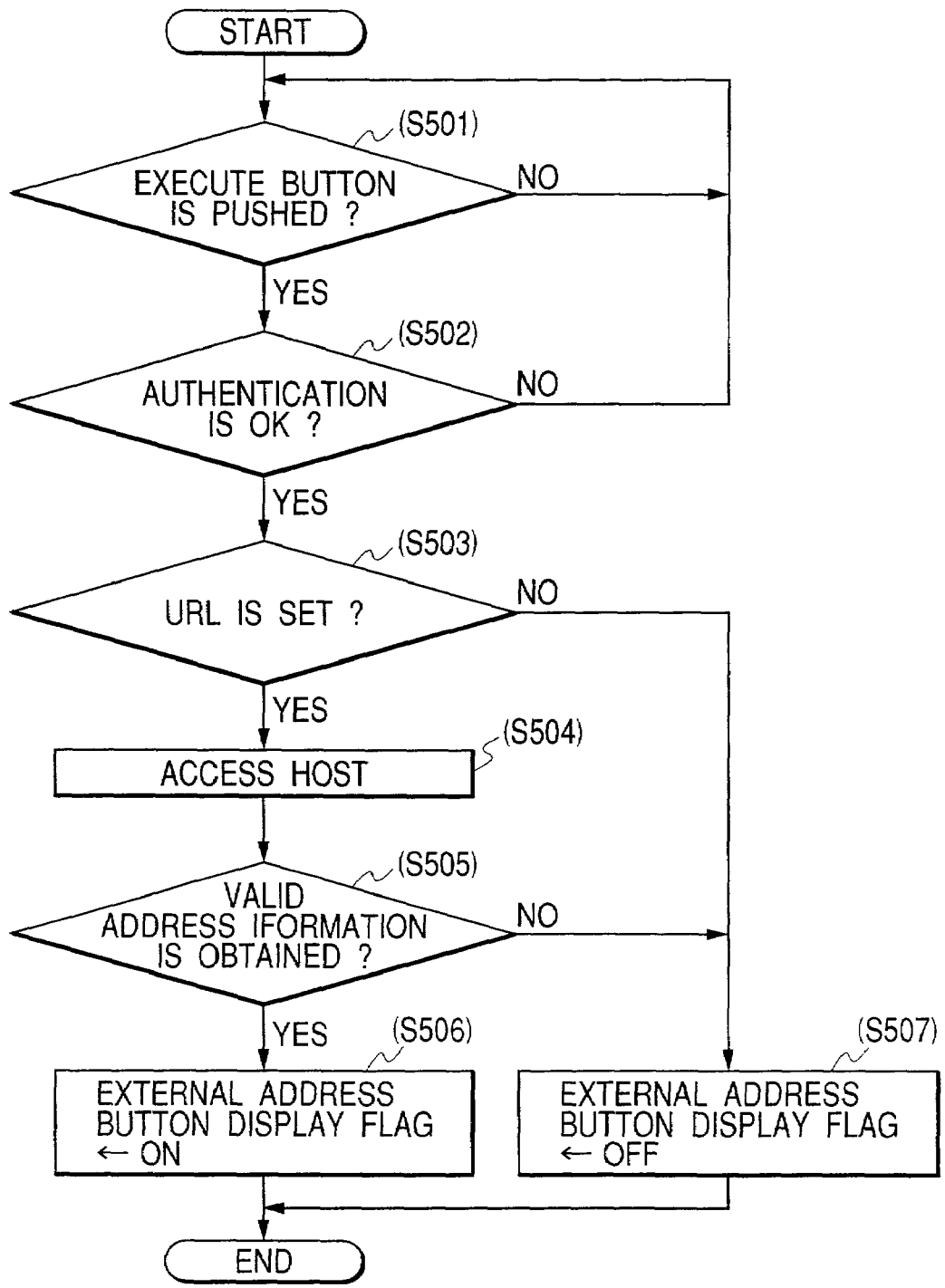
FIG. 10 is a flowchart showing an example of a data processing procedure at the MFP according to the present invention.

FIG. 10 is a flowchart showing an example of a data processing procedure at the MFP according to the present invention. This example corresponds to a procedure of address information obtaining processing at the MFPs 201 and 203 shown in FIG. 2. Note that each of S501 to S507 indicates one of steps in the flowchart shown in FIG. 10.

For instance, if the MFP 201 is activated, the screen shown in FIG. 9 requesting the input of a user name and password that are necessary to use the MFP is displayed on the touch panel 606 shown in FIG. 5.

Here, the user of the MFP inputs his/her user name and password using the input key 604 shown in FIG. 5.

First, in step S501, it is judged whether an execute button 703 shown in FIG. 9 is pushed. Here, the MFP is continuously placed in a state for waiting for an input until the execute button 703 is pushed. Following this, if the execute button 703 is pushed, the processing proceeds to step S502 in which it is judged whether character strings inputted as a user name 701 and a password 702 on the touch panel 606 shown in FIG. 9 match respective character strings preregistered by the administrator of the MFP in the user table shown in FIG. 8 (it is judged whether the result of authentication is OK). If the judgement result is negative, the processing returns to steps S501 to repeat the operation for waiting for an input using the execute button 703.

On the other hand, if the access control unit 410 has judged in step S502 that the user name and password match those registered in the user table, the processing proceeds to step S503 in which the system control unit 403 judges whether data is set in an address information URL item corresponding to the inputted user name.

If the access control unit 410 has judged that the address information URL entry is blank like, for instance, an address information URL item 1002 shown in FIG. 8, the processing proceeds to step S507 in which an external address key display flag is set as "OFF". Then, the processing is ended.

On the other hand, if the access control unit 410 has judged in step S503 that there is set an address information URL, the processing proceeds to step S504 in which a connection to an apparatus specified by the host part of the URL item is established via a predetermined network. Then, address information is obtained.

For instance, in the case of address information 1001 shown in FIG. 8 that is used in the system construction shown in FIG. 2, "172. 20. 1. 12" corresponds to the host part. That is, communication with "172. 20. 1. 12" (the information processing apparatus 202 shown in FIG. 2) is performed using the HTTP protocol specified by a protocol part, and access to an addr. html file specified by a file part is performed.

During this processing, in the information processing apparatus 202 shown in FIG. 2, the WWW server 302 that has received an access request specifying the addr. html file activates the address information conversion program 303 and converts address information shown in FIG. 11 that is stored in the address book 305 into an XML format shown in FIG. 12. Each "NAME" item of the address information shown in FIG. 11 is converted into a part surrounded by tags <name> and </name> in an XML file shown in FIG. 12. Also, each "FAX NUMBER" item is converted into a part surrounded by tags <fax> and </fax> and each "E-MAIL ADDRESS" item is converted into a part surrounded by tags <e-mail> and </e-mail>. This address information converted into the XML format is transmitted to the MFP 201. In this manner, the MFP 201 obtains the address information possessed by the information processing apparatus 202. Note that the address information shown in FIG. 11 is expressed as a table for ease of explanation, although the actual address information may be data stored in a database or data stored in a file in binary form. That is, it does not matter which storage format is used.

Then, in step S505, the system control unit 403 judges whether address information specified by the address information URL item is obtained and, if it is judged that the address information is not obtained, the processing proceeds to step S507 in which the external address key display flag stored in the system storage area 411 is set as "OFF". If it is judged that the address information is obtained, the processing proceeds to step S506 in which the external address key display flag is set as "ON". Then, the processing is ended.

After the processing shown in the flowchart in FIG. 10 is completed in this manner, the touch panel is switched to the display state of the touch panel 606 shown in FIG. 5.

Here, if the address key 609 is touched, address information is displayed on the touch panel, as shown in FIG. 6. The user selects a facsimile transmission destination from the displayed address information. If the foregoing external address key display flag, whose setting is performed by the processing in step S506 or S507 in FIG. 10, is set as ON, the external address display key 804 shown in FIG. 6 is displayed on the touch panel 606. At the same time, the address information obtained in step S505 in FIG. 10 is displayed in the address display area 801. On the other hand, if the external address key display flag is set as OFF, the external address display key 804 shown in FIG. 6 is not displayed and address information stored in a device address book that is separately provided in the MFP is displayed in the address display area 801 as in the case where the device address key 807 is pushed.

It should be noted here that in the present embodiment, there has been described an example in which addresses are displayed and one of the addresses is selected for facsimile transmission at the MFP. However, needless to say, as indicated by reference numeral 1501 in FIG. 11, if an e-mail address is stored together with a facsimile number in an address book specified by address location information and it is possible for the MFP to transmit an e-mail, the user is able to select a transmission destination by displaying e-mail addresses during e-mail transmission processing.

As described above, with the present embodiment, address information stored in the information processing apparatus to which it is possible to connect via an arbitrary communication medium is obtained on the basis of an address information URL corresponding to user information inputted for authenticating a user when he/she uses the MFP. Then, the obtained address information is displayed on a display apparatus of the MFP. This allows the user to refer to and use address information of another device that he/she uses on a day-to-day basis or an information processing apparatus by operating an operation panel of the MFP. As a result, without performing special operations, it is possible for the user to refer to and use address information individually possessed by the user from an apparatus that is currently used. As a result, there is improved usability.

It should be noted here that in the present embodiment, an address information control program is recorded on a floppy disk set in the floppy disk drive 110. This will be described with reference to FIG. 13.

Figure 13:
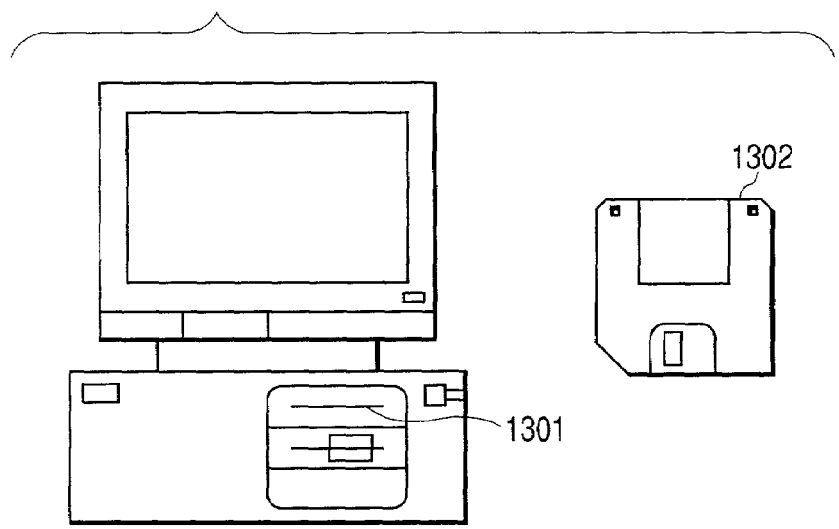
FIG. 13 illustrates a state where control program installation processing is performed at the information processing apparatus according to the present invention.

FIG. 13 illustrates a state where control program installation processing is performed at the information processing apparatus according to the present invention. In this embodiment, it is possible to load the address information control program and related data recorded on the FD 1302 into the information processing apparatus through the mediation of a floppy disk apparatus (FDD) 1301, as shown in FIG. 13.

In FIG. 13, reference numeral 1301 denotes the FDD of the information processing apparatus and numeral 1302 represents the floppy disk in which various control program execution files and program data files are stored.

Figure 14:
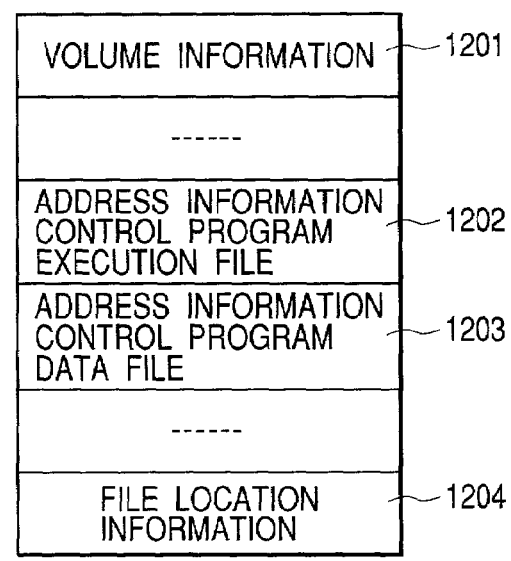
FIG. 14 illustrates a memory map of a floppy disk (FD) shown in FIG. 13.

FIG. 14 illustrates a memory map of the FD 1302 shown in FIG. 13. This drawing corresponds to a state where an address information control program execution file 1202, an address information control program data file 1203, file location information 1204, and the like are stored according to volume information 1201.

Figure 15:
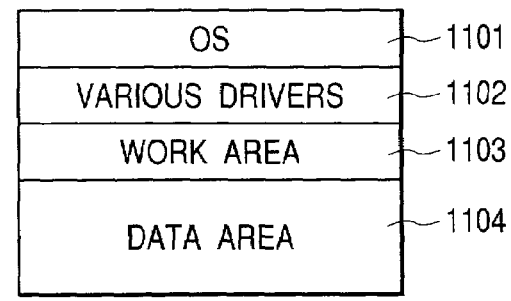
FIG. 15 shows an example of a memory map of a main storage area in the information processing apparatus according to the present invention.

FIG. 15 shows an example of a memory map of a main storage area in the information processing apparatus according to the present invention. This drawing shows a memory map of the RAM 102 shown in FIG. 1.

In FIG. 15, reference numeral 1101 denotes an OS that is loaded from the hard disk 112, numeral 1102 various drivers such as a printer driver, numeral 1103 a work area, and numeral 1104 a data area.

The user inserts the FD 1302 into the FDD 1301. It is possible to perform an operation by reading the address information control program execution file 1202 and related data (address information control program data file 1203) into the RAM 102 under the control by the operating system (OS) 1101 and various drivers 1102 shown in FIG. 15 of the information processing apparatus.

Alternatively, the address information control program and the related data may be read from the FD 110, temporarily stored in the HD 112, and loaded into the RAM 102 when the program is used.

Also, the medium in which the address information control program and the related data are recorded is not limited to the FD. That is, any other recording medium, such as a CD-ROM or a memory card, may be instead used so long as it is possible for the information processing apparatus to read the recording medium.

Next, a modification of the aforementioned embodiment will be described below.

The embodiment described above relates to a construction where authentication is performed each time a user uses the MFP and there is obtained address information specified by an address information URL related to inputted authentication information.

However, in general, address information is not updated on a day-to-day basis and the update frequency of the address information is relatively low, so that the above construction may be changed as follows. When the MFP obtains address information, the date on which the address information is obtained is recorded in association with authentication information and the address information is stored in a nonvolatile storage medium like the system storage area 411 shown in FIG. 4. At the next time when authentication processing is performed, an elapsed time is calculated from the difference between the date on which the next authentication processing is performed and the date recorded in association with the authentication information. Only if the elapsed time exceeds a predetermined time period, address information specified by an address information URL is obtained. At other times, address information stored in the nonvolatile storage medium is referred to.

In the case indicated by reference numeral 1601 in FIG. 16, there is obtained a construction described below. The update date (date on which address information was obtained) is "Apr. 1, 2001" and the update interval set for a user is "10 days", so that if this user performs authentication processing using an MFP after Apr. 11, 2001, the system control unit 403 recognizes that a time exceeding the update interval has elapsed and obtains address information specified by an address information URL. If authentication processing is performed before Apr. 11, 2001, the address information stored in the system storage area 411 is obtained.

It is possible to set, for each user, an arbitrary value for the update interval between the time when address information is obtained and the next time when the address information is obtained as in the address information URL. If a value "0" is specified, address information specified by an address information URL is obtained each time authentication processing is performed as in the aforementioned first embodiment.

Also, if a user updates address information at the information processing apparatus before a time corresponding to the update interval has elapsed, there is a possibility that it is impossible to obtain the updated address information until the time corresponding to the update interval has elapsed. In view of this problem, an update key (not shown) is arranged on the touch panel 606. If this update key is pushed, address information specified by an address information URL is obtained without delay and is displayed in the address display area 801. In this manner, there is further improved the usability.

With this modification, obtained address information is stored in a nonvolatile storage medium and, if a time corresponding to an update interval set for each user has elapsed after the previous operation for obtaining address information or if the update key displayed on the touch panel is pushed, address information specified by an address information URL is obtained. At other times, there is referred to address information stored in the nonvolatile storage medium. This makes it possible to reduce the load on a network and a source from which address information is obtained.

Next, another modification will be described below.

In the aforementioned embodiment, there is obtained a construction where it is possible to switch between the display of device addresses possessed by the MFP and the display of obtained external addresses using the device address key 807 and the external address key 804. In this modification, however, as shown in FIG. 17, there is achieved a construction where it is possible to combine address information concerning device addresses and address information concerning external addresses and to display the combined address information on a screen.

Figures 16, 17:
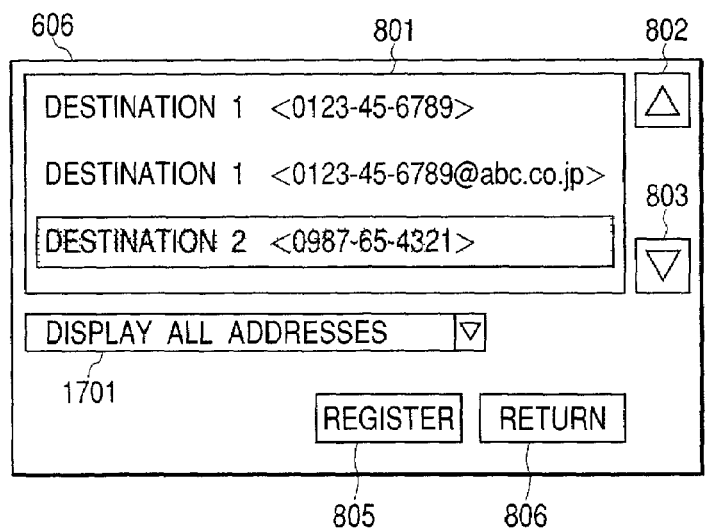
FIG. 16 shows an example of a user table according to a modification of the present invention.
FIG. 17 shows an example of an operation screen displayed on the touch panel according to another modification of the present invention.

In FIG. 17, reference numeral 1701 denotes a list box used to specify the classification of addresses to be displayed. When the list box 1701 is pushed, there are displayed three items "display all addresses", "display only device addresses", and "display only external addresses". When one of these items is selected (pushed), an address list of the selected address classification is displayed in the address display area 801.

It should be noted here that there is a possibility that the same destination name ("destination 1" in FIG. 17) is set for an external address and a device address. In this case, it is effective that addresses (FAX number and the like) corresponding to the destination name are successively displayed on a plurality of lines from the viewpoint of improving usability. Also, if there exist a plurality of addresses (FAX number and the like) that are the same and correspond to the same destination name, it is more suitable that control is performed so that the plurality of addresses are not displayed but only one of the addresses is displayed.

With the present modification, two classifications of address information are combined with each other and the combined address information is displayed. As a result, in the case where simultaneous transmissive communication is performed for an address that is registered only as a device address and an address that is registered only as an external address, it is possible to register destinations by performing a simple operation. In this manner, there is improved operability.

The embodiment and each modification have been described above. In these embodiment and modifications, there has been described a case where an MFP obtains address information within an information processing apparatus. However, as indicated by reference numeral 203 in FIG. 2, there is obtained an effect that it is possible to use, at an apparatus, address information of another apparatus connected to a network even with a construction where address information is obtained from a multifunctional apparatus that is capable of recognizing an HTTP protocol and outputting address information. Also, the WWW server 302 in FIG. 3 may be replaced with a program, such as an FTP server program, that uses a protocol with which it is possible to perform other data transfer.

It should be noted here that a construction where the embodiment and each modification described above are combined as appropriate is included in the scope of application of the present invention.

With the embodiment and each modification described above, authentication information inputted to use a multifunctional apparatus is registered in association with an address information URL specifying address information of another apparatus that is used on a day-to-day basis. When the address information is referred to from the multifunctional apparatus, the address information specified by the address information URL is obtained and displayed, so that it is possible to freely construct a data processing environment in which address information is referred to and used between different apparatuses. As a result, there is markedly improved convenience for a user.

The following description concerns the construction of a computer program that is readable in a system constructed using the information processing apparatus and the multifunctional apparatus according to the present invention. The following description will be made with reference to the memory map shown in FIG. 18.

Figure 18:
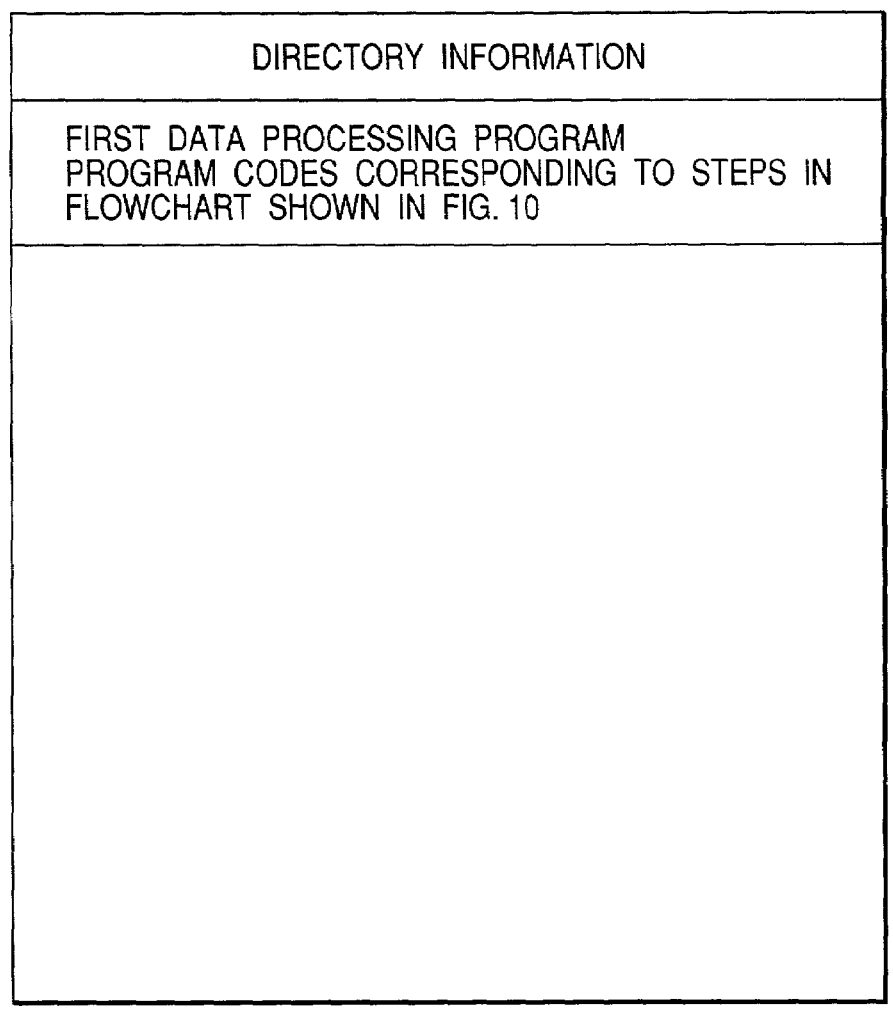
FIG. 18 illustrates a memory map of a recording medium in which there are stored various data processing programs that are readable in a system constructed using the information processing apparatus and the MFP according to the present invention.

FIG. 18 illustrates the memory map of a recording medium in which there are stored various data processing programs that are readable in the system constructed using the information processing apparatus and the multifunctional apparatus according to the present invention.

It should be noted here that although not specifically shown in the drawing, there may be a case where there are also stored information, such as version information and creator information, for managing a group of programs stored in a storage medium and information, such as icons for distinguishably displaying the programs, that depends on an OS and the like on the side where the programs are read.

Further, data belonging to various programs are also managed in the directory described above. Also, there may be a case where there are also stored a program for installing various programs into a computer, a program for decompressing a compressed program that should be installed into a computer, and the like.

The function shown in FIG. 10 of the aforementioned embodiment may be performed by a host computer that executes a program installed from the outside. Also, in this case, the present invention is applicable to a case where a group of information including programs is supplied to an output apparatus from a storage medium, such as a CD-ROM, a flash memory, or an FD, or from an external storage medium via a network.

Needless to say, it is possible to achieve the objects of the present invention by supplying, to a system or an apparatus, a storage medium in which there is recorded program code of software for realizing the functions described in the aforementioned embodiment and by having a computer (or a CPU or an MPU) of the system or the apparatus read the program code stored in the storage medium and execute the read program code.

In this case, the program code itself read from the recording medium realizes the novel functions of the present invention. This means that a storage medium in which the program code is stored constructs the present invention.

As the recording medium for supplying the program code, there may be, for instance, used a floppy disk, a hard disk, an optical disk, a magneto-optical disk, a CD-ROM, a CD-R, a magnetic tape, a nonvolatile memory card, a ROM, an EEPROM, and the like.

Also, needless to say, in addition to the case where the functions described in the aforementioned embodiment are realized by a computer executing the read program code, the present invention includes a case where an OS (operating system) or the like running on a computer performs all or a part of actual processing according to the contents of the program code and the functions described in the aforementioned embodiment are realized by the processing.

Further, needless to say, the present invention includes a case where the program code read from the storage medium is written into a memory provided on a feature expansion board inserted into a computer or a memory provided in a feature expansion unit connected to a computer, a CPU or the like provided on the feature expansion board or in the feature expansion unit performs all or a part of actual processing according to the contents of the program code, and the functions described in the aforementioned embodiment are realized by the processing.

As many apparently widely different embodiments of the present invention can be made without departing from the spirit and scope thereof, it is to be understood that the invention is not limited to the specific embodiments thereof except as defined in the appended claims.

As described above, with the present invention, it becomes possible to freely construct a data processing environment having superior convenience in which a multifunctional apparatus and an information processing apparatus are included and communication information managed by an external apparatus connected via a predetermined communication medium is obtained and is used.

Also, there is achieved an effect of making it possible to freely construct a data processing environment having superior convenience in which if an external apparatus receives a request for communication information from a multifunctional apparatus, the communication information is converted into communication information that is usable at the multifunctional apparatus and the converted communication information is transferred to the multifunctional apparatus that has requested the information, thereby making it possible for the multifunctional apparatus to use the communication information even if the communication information is managed by the external apparatus in a unique data format.

What is claimed is:

1. A communication apparatus, comprising:
   an image capture unit, adapted to capture an image and to generate data based on the captured image;
   a communication unit, adapted to transmit the data generated by said image capture unit to a designated destination;
   a management unit, adapted to manage ID information determined for each user and address location information associated with the ID information, wherein the address location information indicates a location that stores address information for designating the destination to transmit the data by said communication unit;
   an input unit with which the user inputs the ID information;
   an obtaining unit, adapted to specify the address location information managed by said management unit based on the ID information input by said input unit, to communicate with an external apparatus via a network based on the specified address location information, and to obtain the address information residing at the external apparatus corresponding to the location specified by the address location information; and
   a control unit, adapted to judge whether or not the address information is to be obtained based on the ID information input by said input unit, and to control said obtaining unit according to the result of the judgement,
   wherein said communication unit transmits the data to the destination designated from the address information obtained by said obtaining unit.

2. A communication apparatus according to claim 1, further comprising a display unit adapted to display the address information obtained by the obtaining unit.

3. A communication apparatus according to claim 1, wherein the address information is address information converted by the external apparatus into a data format that is usable at the communication apparatus.

4. A communication apparatus according to claim 1, wherein the address information is data written in an XML language.

5. A communication apparatus according to claim 1, further comprising an authentication unit adapted to authenticate the user based on the ID information input by the input unit and the information managed by the management unit.

6. A communication apparatus according to claim 1,
   wherein the control unit judges whether or not it is required to obtain the address information based on a predetermined condition which is determined for each ID information managed by said management unit.

7. A communication apparatus according to claim 1, wherein the management unit manages the ID information and the address location information by utilizing a nonvolatile storage medium.

8. A communication apparatus according to claim 2, wherein the display unit separately displays address information possessed by the communication apparatus in advance and the address information obtained from the external apparatus.

9. A communication apparatus according to claim 2, wherein the display unit displays address information possessed by the communication apparatus in advance and the address information obtained from the external apparatus at the same time by combining the possessed address information and the obtained address information.

10. A communication apparatus according to claim 2, further comprising a selection unit adapted to select a desired destination candidate from the address information displayed by the display unit.

11. A communication apparatus according to claim 6, wherein the predetermined condition is timing information that determines intervals between operations for obtaining the address information.

12. A communication apparatus according to claim 1, further comprising an update unit adapted to forcibly obtain the address information even in a case where the control unit judges that the address information is to be obtained.

13. A communication method for a communication apparatus, comprising the steps of:
   an image capture step of capturing an image and generating data based on the captured image;
   a communication step of transmitting the data generated by said image capture step to a designated destination;
   a management step of managing ID information determined for each user and address location information associated with the ID information, wherein the address location information indicates a location that stores address information for designating the destination to transmit the data by the communication step;
   an input step in which the user inputs the ID information;
   an obtaining step of specifying the address location information managed in the management step based on the ID information input by said input step, communicating with an external apparatus via a network based on the address location information, and obtaining the address information residing at the external apparatus corresponding to the location specified by the address location; and
   a control step of judging whether or not the address information is to be obtained based on the ID information input by said input step, and controlling said obtaining step according to the result of the judgment,
   wherein the communication step transmits the data to the destination designated from the address information obtained by the obtaining step.

14. A computer-readable control program stored on a computer-readable medium, the program being executable by a communication apparatus, the program comprising the steps of:
   an image capture step of capturing an image and generating data based on the captured image;
   a communication step of transmitting the data generated by said image capture step to a designated destination;
   a management step of managing ID information determined for each user and address location information associated with the ID information, wherein the address location information indicates a location that stores address information for designating the destination to transmit the data by the communication step;
   an input step in which the user inputs the ID information;
   an obtaining step of specifying the address location information managed in the management step based on the input ID information, communicating with an external apparatus via a network based on the address location information, and obtaining the address information residing at the external apparatus corresponding to the location specified by the address location information; and
   a control step of judging whether or not the address information is to be obtained based on the ID information input by said input step, and controlling said obtaining step according to the result of the judgment,
   wherein the communication step transmits the data to the destination designated from the address information obtained by the obtaining step.

15. A computer-readable recording medium storing a control program executable by a communication apparatus, the program comprising the steps of:
   an image capture step of capturing an image and generating data based on the captured image;
   a communication step of transmitting the data generated by said image capture step to a designated destination;
   a management step of managing ID information determined for each user and address location information associated with the ID information, wherein the address location information indicates a location that stores address information for designating the destination to transmit the data by the communication step;
   an input step in which the user inputs the ID information;
   an obtaining step of specifying the address location information managed in the management step based on the input ID information, communicating with an external apparatus via a network based on the address location information, and obtaining the address information residing at the external apparatus corresponding to the location specified by the address location information; and
   a control step of judging whether or not the address information is to be obtained based on the ID information input by said input step, and controlling said obtaining step according to the result of the judgement,
   wherein the communication step transmits the data to the destination designated from the obtained address information by the obtaining step.

16. A communication apparatus according to claim 1, wherein the control unit controls the obtaining unit to obtain the address information in a case where a prescribed time has passed since a last time that the obtaining unit obtained the address information, wherein the control unit reads address information possessed by the communication apparatus in advance in a case where the prescribed time has not passed since the last time that the obtaining unit obtained the address information.

17. A communication apparatus comprising:
   a management unit, adapted to manage ID information determined for each user and address location information associated with the ID information, wherein the address location information indicates a location that stores communication information;
   an input unit with which the user inputs the ID information;
   an obtaining unit, adapted to specify the address location information managed by said management unit based on the ID information input by said input unit, to communicate with an external apparatus via a network based on the address location information, and to obtain the communication information residing at the external apparatus corresponding to the location specified by the address location information; and
   a control unit, adapted to judge whether or not the address information is to be obtained based on the ID information input by said input unit, and to control said obtaining unit according to a result of the judgment.

18. A communication apparatus according to claim 17, wherein the communication information is address information which designates a destination.

19. A communication apparatus according to claim 17, wherein the control unit judges whether or not the address information is to be obtained based on a predetermined condition which is determined for each ID information managed by said management unit.

20. A communication apparatus according to claim 19, wherein the predetermined condition is timing information that determines intervals between operations for obtaining the address information.

21. A communication apparatus according to claim 17, wherein the control unit controls the obtaining unit to obtain the address information in a case where a prescribed time has passed since a last time that the obtaining unit obtained the address information, wherein the control unit reads address information possessed by the communication apparatus in advance in a case where the prescribed time has not passed since the last time that the obtaining unit obtained the address information.

22. A communication apparatus according to claim 17, further comprising an update unit adapted to forcibly obtain the address information even in a case where the control unit judges that the address information is to be obtained.

23. A communication method comprising the steps of:
   a management step of managing ID information determined for each user and address location information associated with the ID information, wherein the address location information indicates a location that stores communication information;
   an input step in which the user inputs the ID information;
   an obtaining step of specifying the address location information managed in the management step based on the ID information input by said input step, communicating with an external apparatus via a network based on the address location information, and obtaining the communication information residing at the external apparatus corresponding to the location specified by the address location information; and
   a control step of judging whether or not the address information is to be obtained based on the ID information input by said input step, and controlling said obtaining step according to a result of the judgment.

24. A computer-readable control program stored on a computer-readable medium, the program executable by a communication apparatus, the program comprising the steps of:
   a management step of managing ID information determined for each user and address location information associated with the ID information, wherein the address location information indicates a location that stores communication information;
   an input step in which the user inputs the ID information;
   an obtaining step of specifying the address location information managed in the management step based on the ID information input by said input step, communicating with an external apparatus via a network based on the address location information, and obtaining the communication information residing at the external apparatus corresponding to the location specified by the address location information; and
   a control step of judging whether or not the address information is to be obtained based on the ID information input by said input step, and controlling said obtaining step according to a result of the judgment.

25. A computer-readable recording medium storing a control program executable by a communication apparatus, the program comprising the steps of:
   a management step of managing ID information determined for each user and address location information associated with the ID information, wherein the address location information indicates a location that stores communication information;
   an input step in which the user inputs the ID information;
   an obtaining step of specifying the address location information managed in the management step based on the ID information input by said input step, communicating with an external apparatus via a network based on the address location information, and obtaining the communication information residing at the external apparatus corresponding to the location specified by the address location information; and
   a control step of judging whether or not the address information is to be obtained based on the ID information input by said input step, and controlling said obtaining step according to a result from the judgment.

* * * * *